No. 765,716. Patented July 26, 1904.

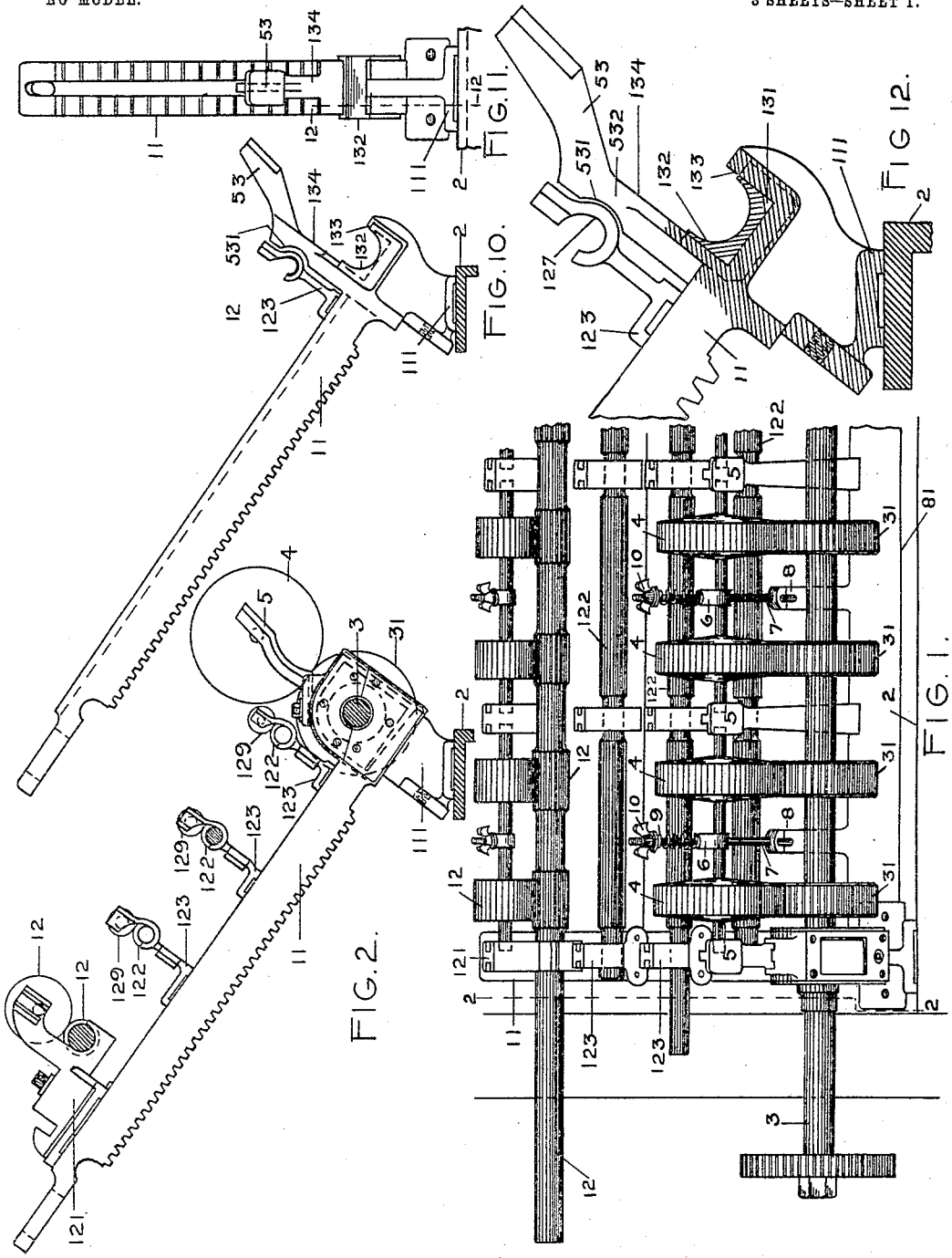

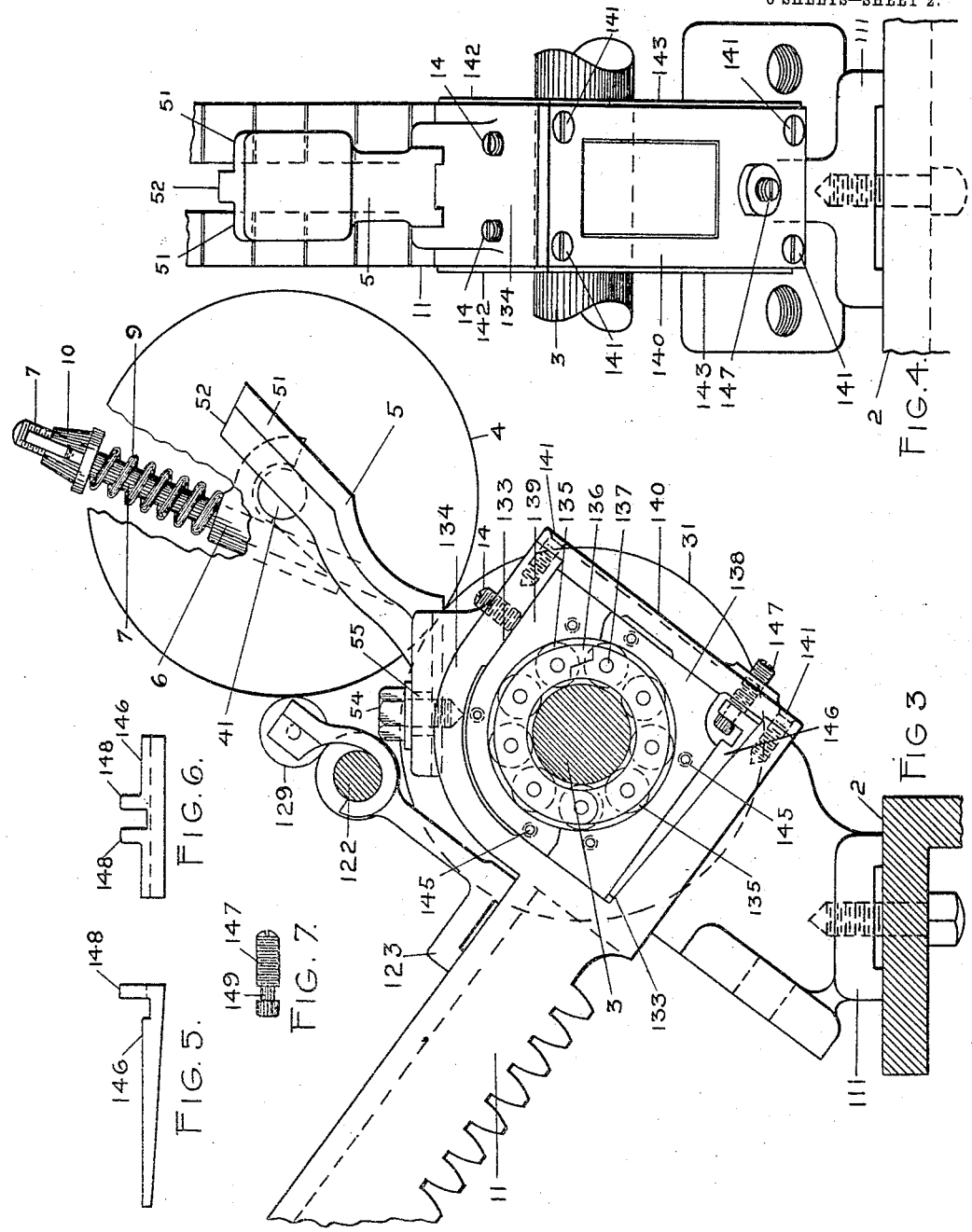

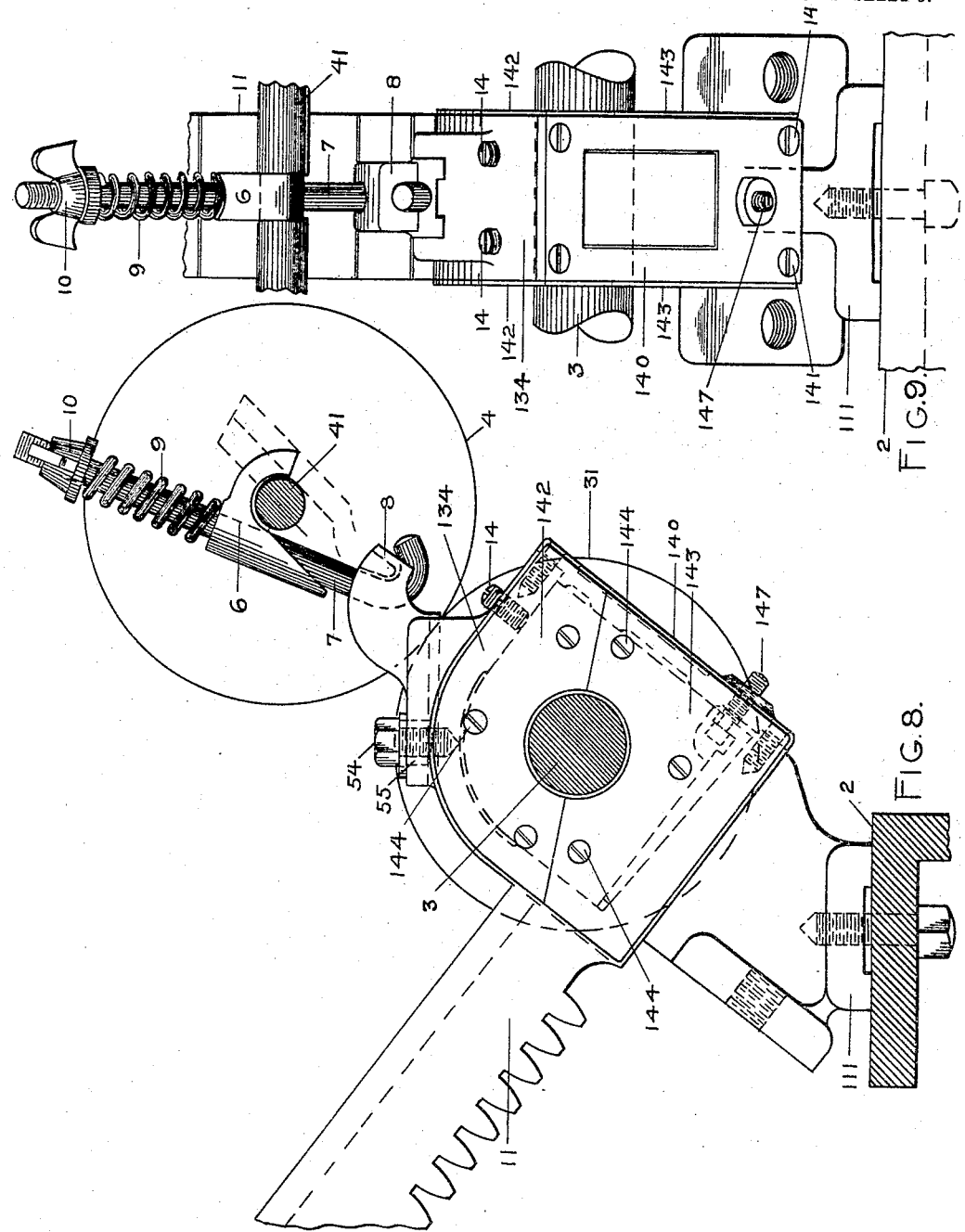

UNITED STATES PATENT OFFICE.

FREDERICK PIERPONT SHAW, OF LOWELL, MASSACHUSETTS, ASSIGNOR TO LOWELL MACHINE SHOP, OF LOWELL, MASSACHUSETTS, A CORPORATION OF MASSACHUSETTS.

MACHINE FOR PREPARING AND SPINNING WORSTED.

SPECIFICATION forming part of Letters Patent No. 765,716, dated July 26, 1904.

Application filed April 5, 1904. Serial No. 201,737. (No model.)

*To all whom it may concern:*

Be it known that I, FREDERICK PIERPONT SHAW, residing at Lowell, in the county of Middlesex and State of Massachusetts, have invented certain new and useful Improvements in Machines for Preparing and Spinning Worsted, of which the following description, with the accompanying drawings, is a specification, like numerals on the drawings denoting like parts.

The invention has relation to certain of the adjuncts of the front drawing-rolls of drawing mechanism of the type that is employed in machines for preparing and spinning worsted and in the like machines.

In particular the invention relates to the means of supporting the lower front drawing-roll of a drawing mechanism of such type and to the usual fixtures—in the present instance the horn and hook—which are employed in connection with the front top rolls.

General objects of the invention are to provide an improved construction, arrangement, and combination of the said means and fixtures, to facilitate the use in the mechanism aforesaid of larger and better bearings in connection with the lower front drawing-roll than it heretofore has been practicable to employ, to permit the bearing-surfaces at such bearings to be covered in and protected from access of flyings, dust, &c., and to render the use of roller-bearings feasible.

I have illustrated my invention in the accompanying drawings, in which—

Figure 1 shows in front elevation portion of a drawing mechanism having one embodiment of the invention applied thereto. Fig. 2 is a sectional side elevation thereof, the plane of section being indicated by the dotted line 2 2, Fig. 1. Fig. 3, Sheet 2, is a detail view in section on the line 2 2, Fig. 1, on a larger scale than Figs. 1 and 2, with the casing-plates pertaining to the end of the bearing removed. Fig. 4, Sheet 2, shows in front elevation certain of the parts of Fig. 3 with the casing-plates in position. Figs. 5 and 6, Sheet 2, show in side elevation and front elevation, respectively, the adjusting-wedge of Fig. 3; and Fig. 7, same sheet, shows the adjusting-screw of Fig. 3. Figs. 8 and 9, Sheet 3, are views showing in sectional side elevation and front elevation, respectively, portions of a drawing mechanism in which the so-called "hook" is mounted upon the bearing-stand. Fig. 10, Sheet 1, shows in side elevation a roll-stand of the form employed in practice heretofore, with the front carrier-stand mounted thereon, the roller-beam being shown in vertical section. Fig. 11, Sheet 1, shows the parts of Fig. 10 in front elevation. Fig. 12, Sheet 1, shows the front end of the said roll-stand of Figs. 10 and 11 in partly-sectional side elevation, the section being on the plane that is indicated by the dotted line 12 12, Fig. 11.

Having reference to the drawings, the latter show only a small portion of the drawing mechanism of a machine for preparing or spinning worsted, simply enough to indicate clearly the nature and relations of the invention itself. A portion of the usual roller-beam of such mechanism is represented at 2, and at 11 is shown one of the roll-stands. As is well understood, a number of roll-stands is employed in the length of the machine in practice. Their forward ends are provided with feet, as 111, which rest upon and are secured to the roller-beam. Their rear ends are supported by portions of the framework, which are not shown in the drawings. Rear drawing-rolls are represented at 12 12, Figs. 1 and 2. At 121 in said figures is shown one of the stands for the said rear drawing-rolls. The said stands are mounted upon the said roll-stands, being applied to the slideways or guideways with which the roll-stands are provided and are adjustable in well-known manner along the said slideways or guideways in the direction from front to rear in the machine to increase or diminish the distance separating the rear drawing-rolls from the front drawing-rolls.

At 122 122, &c., are shown the usual carrier-rolls, which are located intermediate the rear drawing-rolls and the front drawing-rolls, and at 123 123, &c., are shown the carrier-stands supporting the carrier-rolls 122 122, &c., the said carrier-stands being mounted upon the roll-stands in the usual manner with capacity for adjustment along the slideways or guideways of the said roll-stands in the direction from front to rear in the machine. The usual wooden presser-rolls which are applied in practice to the carrier-rolls for the purpose of holding the slivers or rovings pressed lightly against the latter are omitted from Fig. 1, but are shown in Figs. 2 and 3 at 129 129, &c. The ends of the said presser-rolls are applied to guides with which the carrier-stands are furnished. The shaft of the lower front drawing-roll is shown at 3, and the drawing-bosses of the said drawing-roll are represented at 31 31, &c. The said shaft is supported in bearings which are provided upon or adjacent the roll-stands, as referred to hereinafter. The front top rolls which cooperate with the bosses 31 31, &c., consist, as usual, of bosses 4 4, &c., which are attached in pairs to short shafts 41 41, &c., the ends of each such short shaft projecting at the opposite sides of the pair of bosses thereon to constitute journals. The fixed "horns," so called, rising adjacent the bosses 31 31, &c., and constituting guides for the said journals whereby the working positions of the front top rolls are determined with respect to the lower front drawing-rolls are marked 5 5, &c. Intermediate the roll-stands the horns are mounted upon the roller-beam or other convenient support. At the roll-stands the horns are applied and supported in the manner which presently will be explained. Each thereof is furnished, as usual, with one or more laterally-projecting wings 51 51, Figs. 3 and 4, Sheet 2, against the rear faces of which the journals of the front top rolls rest, and each horn has a longitudinally-extending rib 52. The ribs of the respective horns serve as guides for the ends of the journals of the front top rolls. They coact with the said ends to prevent endwise movement of the said top rolls, and thereby they fix the position, transversely considered, of the bosses 4 4 of the latter with relation to the bosses 31 31, &c., of the front drawing-roll. The said bosses 4 4 are pressed against the bosses 31 31 of the lower front drawing-roll by means of pressure or tension devices of usual character, such devices being represented in Figs. 1, 3, 8, and 9 and comprising for each pair of front top-roll bosses a saddle 6, which bears upon the upper side of the shaft 41 of such pair of bosses intermediate the latter, a stirrup 7, having the stem thereof passed through a hole in said saddle and its hook-shaped lower end passed through a hole in the fixed so-called "hook" 8 and engaged with the latter, an expanding spiral spring 9, surrounding the upper portion of the said stem above the saddle, and a thumb-nut 10, screwed upon the threaded upper end of the stirrup. The hooks 8 usually are mounted upon the saddle-rail 81, as in Fig. 1, or other convenient support; but in certain cases I contemplate mounting a part thereof upon the roll-stands, as will be explained hereinafter. The said spring 9 is compressed between the thumb-nut and the saddle, and its tension is adjusted by means of the said thumb-nut to secure the desired pressure of the top-roll bosses 4 4 against the bosses 31 31. Pressure or tension devices, in the main similar to those which are used in connection with the front top rolls, are used with the rear top drawing-rolls.

Referring now to the roll-stands, the bearings for the shaft 3 of the lower front drawing-roll, the horns, and the hooks, I will explain the novel construction, &c., in which the invention resides.

Figs. 10, 11, and 12, Sheet 1, show the construction, arrangement, &c., of the roll-stand, the bearing for the lower front drawing-roll, and the horn usually employed heretofore.

In these figures the bearing is marked 132, the seat or socket which is occupied by the said bearing being marked 131 and the horn being marked 53. The front carrier-stand 123 is shown in position upon the slideway or guideway of the roll-stand. The bearing 132 is a simple open-topped bearing or half-box. The seat or socket 131 is formed in the front end of the roll-stand and opens upwardly at right angles to the length of the slideway or guideway of the roll-stand. It is open-topped. The front wall 133 of the said seat or socket rises above the top of the front wall of the bearing directly at the front of the latter; but above the said front wall 133, between the same and the upper portion the horn, there is an unobstructed opening to afford opportunity to insert the bearing or the shaft of the lower front drawing-roll by first moving the same rearward into a position above and in line with the opening of the seat or socket and then moving it downward in the direction of the said opening into working position within the seat or socket and to remove the said shaft or the bearing by the reverse action. The horn 53 must be so shaped and located that it will not interfere with the insertion and removal of the lower front drawing-roll and the bearing 132. Hence at the front it must not extend into the path which is required to be taken by the shaft and bearing in being inserted or removed. In addition in order to enable the bite of the front carrier-roll 122 and its pressure-roll 129 to be set as close to the bite of the front drawing-rolls as possible, as sometimes is required in practice, the horn must not interfere with adjustment of the front carrier-stand far enough forward upon the roll-stand to give the front carrier-roll 122 and its pressure-roll 129 a position in which the peripheries of the said rolls just clear the peripheries of the bosses 4 4 31 31 of the front drawing-rolls. Hence at the rear thereof the horn must be so shaped and located as to permit such adjustment to be made. In order to meet these requirements, the lower portion of the horn is formed as a post rising from the roll-stand at right angles to the length of the slideway or guideway. At the front thereof the said post is formed with a straight surface 134, constituting the upper portion of the rear wall of the seat or socket 131 and also extending in continuation thereof to a distance from said seat or socket sufficient to enable the bearing 132 to occupy a position in line with the seat or socket, but entirely above the upper end of the front wall 133 of the latter. This straight surface acts as a guide for the bearing and shaft in being inserted into place or removed therefrom. The rear side of the horn is located in advance of the foremost position which is required to be assumed by the front carrier-stand, and in order to enable the latter to fit closely up against the horn the said rear side is formed with a hollow 531, which receives the forwardly-projecting convexity 127 of the bearing portion of the said carrier-stand. The thickness of the neck or contracted portion 532 of the post of the horn, Fig. 12, in the direction from front to rear must be sufficient to insure enough material at the said neck in front of the hollow 531 to confer strength to obviate liability to breakage at such neck. Hence inasmuch as the space at the rear of the journal portion of the shaft of the lower front drawing-roll, measuring in the direction from front to rear in the machine, which is available to be occupied by the post of the horn and the portion of the bearing that projects rearward of the said journal portion is small, and as the proportion thereof that is required to be devoted to securing sufficient thickness of the horn at the neck 532 is relatively considerable only a short distance intervenes in practice between the straight front surface 134 of the post of the horn and the surface of the journal portion to receive the rear wall of the bearing 132. Therefore the said rear wall of the said bearing is made quite thin at its upper edge. (See Figs. 10 to 12.) In all instances known to me heretofore the bearing 132 invariably has been a plain or simple bearing, and for want of room, &c., for the convenient application of a cover the said bearing has been left unprovided with a cover, as in the said figures. In operation the portions of the shaft of the lower front drawing-roll which work in the bearings become covered with lubricant, and in consequence of the absence of covers dust and flyings collect upon such portions. As a result the lubricant of the bearings become charged with impurities, which latter clog the bearings and cause cutting of the shaft and the bearings, as well as occasion other injuries. The cutting of the shaft by particles of wool which work in between them progresses rapidly and is an extensive and serious cause of trouble.

In accordance with my present invention the bearing seat or socket is open to the front directly in advance of the front wall of the bearing which occupies the same, as contradistinguished from a bearing seat or socket which is merely open-topped, as heretofore. With my improved construction the bearing and the journal of the lower front drawing-roll which fits therein are inserted into the said bearing seat or socket and are removed therefrom at the front of the bearing seat or socket instead of the top thereof, as heretofore. A bearing seat or socket embodying the invention—*i. e.*, open to the front in advance of the front wall of the bearing and not merely open at the top above the said bearing—is shown at 133, Fig. 3, at the front end of the roll-stand. In the case of a construction in which the bearing seat or socket is formed to permit the bearing and the lower front drawing-roll to be inserted and removed by movement from front to rear, as in Fig. 3, instead of by movement downward or upward, as in the usual construction, (shown in Figs. 10 to 12,) it is unnecessary to have an unobstructed opening above the bearing seat or socket, and it is not required that the supporting portion of the horn or other top-roll fixture should be formed as a post having a straight front surface 134 extended upward in a straight line in continuation of the rear wall of the bearing seat or socket. Consequently I am enabled to enlarge the bearing seat or socket at the rear thereof so as to extend more or less beneath the base or supporting portion of the horn or other top-roll fixture, thereby enabling a larger and better bearing, which may be a roller-bearing, to be employed, and the said base or supporting portion of the horn may overhang the bearing seat or socket to any desired extent and have the operative portion of the fixture set farther forward, so as to leave at the rear thereof ample clear space free to be occupied by the upper or operative portion of the front carrier-stand. If desired, the portion of the base or supporting portion of the fixture which overhangs the bearing seat or socket may be enlarged to constitute a top for the bearing seat or socket, as at 134 in the drawings, or some other approved form of top may be provided. I term the top 134 a "fixed" top, inasmuch as ordinarily it is intended to remain in its working position and not to be removed merely for the purpose of enabling the lower front drawing-roll and its bearing to be taken out or replaced or for other like reasons. In the present instance the top 134 is integral with the stand, which is preferable but not indispensable. It projects forwardly above the bearing that occupies the bearing seat or socket in close proximity to the latter. The operative portion of the horn 5, which is employed at the bearing, rises from this top 134 well forward upon the front portion of the top 134, so that the upwardly-extending operative portion of the horn shall be entirely clear of all portions of the front carrier-stand in the extreme forward position of adjustment of the latter. In consequence of the low position which I am enabled to give the base or supporting portion of the top-roll fixture—i. e., the top 134, as shown in Fig. 3—the upper portion of the front carrier-stand rises above the former, and its bearing portion is free to project forward over the same, as in the said figure. At the place of the connection of the curved rear portion of the base or supporting portion (top 134) of the top-roll fixture with the stand it is necessary only that such portion should have sufficient thickness to insure strength. The proper strength of the same admits of being secured with considerably less thickness in the direction from front to rear in the machine than is employed at the base of the post of the horn of the old construction which is represented in Figs. 10, 11, and 12. I am therefore enabled to reduce the thickness in the said direction at the place mentioned and also to give the said portion a position rearward closely adjacent the front end of the slideway or guideway of the roll-stand. The relatively small thickness of this portion in the direction from front to rear and the rearward position occupied thereby leave considerable more space available in advance of the same at the rear of the axis of the lower front drawing-roll for use in connection with the bearing than in the old construction shown in Figs. 10 to 12.

In Fig. 3 I have shown applied to the bearing seat or socket and in connection with the journal portion of the lower front drawing-roll a convenient construction of roller-bearing, the same comprising, essentially, a series of antifriction-rolls 135 135, &c., a cage for the said rolls consisting of annular end pieces 136 (one only being shown in Fig. 3) and pins 137 137, &c., passing centrally through the said antifriction-rolls and engaged at their opposite ends with the annular end pieces 136, a lower half-box 138, upon the concave surface of which the antifriction-rolls travel and by which they are sustained, and an upper half-box 139, which is concaved to fit over the upper portion of the series of antifriction-rolls and the corresponding portions of their annular end pieces. In practice I make suitable provision for securing the bearing in place within the bearing seat or socket 133. This may be effected in various ways. In the present instance I accomplish said result and at the same time close the opening at the front of the bearing seat or socket, so as to exclude dust, flyings, and the like, by means of a removable cover-plate 140, which is held in place by means of screws 141 141, &c. The inner side of the said cover makes contact with the forward ends of the half-boxes 138 139, and thereby the cover holds the latter from displacement forwardly. The two half-boxes are confined and clamped between the said cover and the inner end of the bearing seat or socket. The fixed top 134 serves to cover the bearing above. It will be perceived that when such fixed top is an integral portion of the roll-stand, as in Fig. 3, it constitutes a cover that requires no fastenings at the rear of the axis of the lower front drawing-roll to occupy space. The extent to which the top 134 projects forward above the bearing, as well as its form and dimensions, as well as those of the cover-plate 140, and the manner and means of effecting the attachment of the cover-plate, may vary in practice. For the purpose of closing the opposite ends of the bearing against the admission of dust, flyings, &c., I employ the upper and lower casing-plates 142 143, (shown best in Figs. 2, 8, and 9,) which are fastened in place by means of screws 144 144, &c., Fig. 8, the stems of the said screws entering threaded holes 145 145, &c., Fig. 3, which are tapped in the opposite ends of the half-boxes 138 139. The casing-plates meet at front and rear of the shaft 3 of the lower front drawing-roll, as shown in Figs. 2 and 8, and are concaved to fit closely around the said shaft. For the purpose of providing for vertical adjustment of the bearing within the bearing seat or socket any usual or preferred means may be employed. I have herein shown a convenient means of adjustment comprising a wedge 146, Figs. 3, 5, and 6, and an adjusting-screw 147, Figs. 3, 4, and 7. The wedge 146 is introduced between the under side of the half-box 138 and the bottom of the bearing seat or socket 133. The lower surface of the wedge is formed at a slight angle with reference to the upper surface thereof. The said upper surface fits against the under side of the half-box 138, while the inclined lower surface of the wedge fits against the correspondingly-inclined bottom of the bearing seat or socket. At its outer end the wedge is formed with a pair of lugs 148 148, and the screw 146 is reduced in diameter near its inner end, forming a neck 149, Fig. 7. The said neck of the screw is fitted between the lugs 148 148. When the screw is turned in the threaded hole which is tapped through the lower part of the cover-plate 140 and within which the said screw is fitted, the engagement of the shoulders which exist at the opposite sides of the said neck 149 with the lugs 148 148 causes the wedge 146 to be moved endwise in order thereby to either raise the bearing or lower the same. In this manner the bearing may be adjusted in the direction and to the extent which may be required in alining the said bearing with the others which are employed in connection with the lower front drawing-roll. It is not intended in the present instance that the rolls 135 135 shall make contact with the under surface of the upper half-box 139, and accordingly the concavity of the said upper half-box is formed with a radius slightly greater than that of the curved path along which the outer portions of the antifriction-rolls travel. 14 14 are set-screws which are fitted to threaded holes that are tapped through the fixed top 134 and bear it at their lower ends against the top of the said upper half-box 139. The said upper half-box intervenes between the said set-screws and the lower half-box 138 and serves to hold or clamp the latter down to place by transmitting pressure to the same from the set-screws 14 14. The said upper half-box may be dispensed with in many cases, in which event the screws 14 14, or the equivalent thereof, if employed, may be arranged to coact directly with the half-box 138.

Preferably the horn 5 is formed as a separate piece and is detachably secured, by means of a screw 54, to the fixed top 134. The detachability of the horn enables it to be removed whenever worn or injured and a new one to be substituted therefor without it being necessary to replace the entire stand, as heretofore required in the like case. In order to provide for making an angular shift of the front top rolls with respect to the axis of the lower front drawing-roll whenever such shift may be required for the attainment of the best results in practice, the detachable horn is made adjustable upon the fixed top 134 in the direction from front to rear in the machine. To this end the opening 55 in the foot or base of the horn 5, through which the securing-screw 54 passes, is made in the form of a slot that is elongated in the said direction, and the foot or base of the horn is fitted to the fixed top 134 in a manner enabling the horn to be shifted forwardly or rearwardly upon the top when the said securing-screw 54 is loosened. In order to prevent turning or twisting of the horn upon the fixed top 134, the upper side of the top 134 and the foot or base of the horn are formed with interlocking ribs and grooves, as shown best in Fig. 4, which permit the shift aforesaid while operating to prevent lateral movement of the horn.

I have shown the bearing seat or socket 133 as formed in the front end of the roll-stand 11; but it is not necessary to my invention that the said bearing seat or socket should be formed in an integral portion of a roll-stand. It may be formed instead in a separate stand, as will be obvious. For the purpose of this case, therefore, the stand which contains the bearing seat or socket may be regarded as a bearing-stand, and I have thus designated the same in the claims where I seek to distinguish the same broadly from the roll-stand *per se*.

To a certain extent the horns 5 and the hooks 8 are interchangeable in position with relation to the bearing-stands. In other words, in cases in which it is desired that the top rolls, horns, hooks, and tension or pressure devices shall be so arranged as to cause the said tension or pressure devices to act in line vertically with the bearing—as, for instance, in my application for United States Letters Patent for improvements in machines for preparing and spinning worsted, filed April 5, 1904, Serial No. 201,736—a hook 8 may be mounted upon the fixed top 134 of a bearing-stand, as shown in Figs. 8 and 9, in which the arrangement is otherwise essentially the same as in Figs. 3 and 4. My invention in its broader phase will be embodied equally in the case of Figs. 8 and 9, for, as will be perceived, the essential principles of the same are contained in the construction which is shown in the latter figures. For this reason, therefore, I designate both the horn and the hook as "top-roll fixtures," and by the term "top-roll fixture" as employed in certain of the claims I contemplate as well a hook as a horn for the purposes of such claims.

I claim as my invention—

1. In a drawing mechanism, in combination, the lower front drawing-roll, a bearing therefor, a bearing-stand having a bearing-seat opening forwardly for the insertion and removal of the bearing and the journal of the lower front drawing-roll, and provided with a top for the said bearing-seat projecting forward above the bearing in close proximity to the latter, and also with a front top-roll fixture carried by and extending forward from the said top, and front top rolls in operative engagement with the said fixture.

2. In a drawing mechanism, in combination, the lower front drawing-roll, a bearing therefor, a bearing-stand having a bearing-seat opening forwardly for the insertion and removal of the bearing and the journal of the lower front drawing-roll, and provided with a top for the said bearing-seat projecting forward above the bearing in close proximity to the latter, and also with a horn carried by and extending forward from the said top, and front top rolls in engagement with the said horn.

3. In a drawing mechanism, in combination, the lower front drawing-roll, a bearing therefor, a bearing-stand having a bearing-seat opening forwardly for the insertion and removal of the bearing and the journal of the lower front drawing-roll, and provided with a top for the said bearing-seat projecting forward above the bearing in close proximity to the latter, and also with a front top-roll fixture carried by and extending forward from the said top, means to adjust the said bearing within the said bearing-seat in alining the same, and front top rolls in operative engagement with the said fixture.

4. In a drawing mechanism, in combination, the lower front drawing-roll, a bearing therefor, a bearing-stand having a bearing-seat opening forwardly for the insertion and removal of the bearing and the journal of the lower front drawing-roll, and provided with a top for the said bearing-seat projecting forward above the bearing in close proximity to the latter, and also with a horn carried by and extending forward from the said top, means to adjust the said bearing within the said bearing-seat in alining the same, and front top rolls in operative engagement with the said horn.

5. In a drawing mechanism, in combination, the lower front drawing-roll, a bearing therefor, rear drawing-rolls, stands for the said rear drawing-rolls, the carrier-rolls, the carrier-stands, a roll-stand supporting the said carrier-stands and the stand for the rear drawing-rolls, and having at its front end a bearing-seat opening forwardly for the insertion and removal of the said bearing and the journal of the lower front drawing-roll, and provided with a top for the said bearing-seat projecting forwardly above the bearing in close proximity to the latter, and also with a front top-roll fixture carried by and extending forward from the said top, and front top rolls in operative engagement with the said fixture.

6. In a drawing mechanism, in combination, the lower front drawing-roll, a bearing therefor, rear drawing-rolls, a stand for the said rear drawing-rolls, the carrier-rolls, the carrier-stands, a roll-stand supporting the said carrier-stands and the stand for the rear drawing-rolls, and having at its front end the bearing-seat opening forwardly for the insertion and removal of the said bearing and the journal of the lower front drawing-roll, and provided with a top for the said bearing-seat projecting forwardly above the bearing in close proximity to the latter, and also with a front top-roll horn carried by and extending forward from the said top, and front top rolls in operative engagement with the said horn.

7. In a drawing mechanism, in combination, the lower front drawing-roll, a bearing therefor, a stand having a bearing-seat opening to the front directly in advance of the front wall of the said bearing, means to clamp the said bearing in place in the said bearing-seat, and a top-roll fixture having the supporting portion thereof connected with the said stand and extended forward above the bearing in close proximity to the top thereof.

8. In a drawing mechanism, in combination, the lower front drawing-roll, a bearing therefor, a stand having a bearing-seat which is open to the front directly in advance of the front wall of the said bearing, a removable cover extending across in advance of the front wall of the bearing, means to detachably connect the said cover to the bearing-stand, a front top-roll fixture extending forward above the said bearing, and front top rolls in operative engagement with the said fixture.

9. In a drawing mechanism, in combination, the front carrier-roll, the front carrier-stand, the lower front drawing-roll, a bearing therefor, a stand having a bearing-seat which is open to the front directly in advance of the front wall of the said bearing, to permit the bearing to enter or leave the bearing seat or socket by movement in the direction from front to rear, and provided with a top-roll fixture having its base or supporting portion extending forward above and closely adjacent the top of the said bearing, and front top rolls in operative engagement with the said fixture, the said bearing-seat extending to the rear under the said base or supporting portion of the top-roll fixture.

In testimony whereof I affix my signature in the presence of two witnesses.

FREDERICK PIERPONT SHAW.

Witnesses:
ESTHER PERRY TAYLOR,
IRVING DUNNING KIMBALL.